(12) United States Patent
Kirmsze et al.

(10) Patent No.: US 10,773,746 B2
(45) Date of Patent: Sep. 15, 2020

(54) ADJUSTABLE STEERING COLUMN ASSEMBLY

(71) Applicants: THYSSENKRUPP PRESTA AG, Eschen (LI); THYSSENKRUPP AG, Essen (DE)

(72) Inventors: Helmut Kirmsze, Schaan (LI); Sascha Fricke, Hard (AT); Thomas Raich, Vandans (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 103 days.

(21) Appl. No.: 16/146,359

(22) Filed: Sep. 28, 2018

(65) Prior Publication Data

US 2020/0101999 A1 Apr. 2, 2020

(51) Int. Cl.
*B62D 1/184* (2006.01)
*B62D 1/183* (2006.01)
*B62D 1/19* (2006.01)

(52) U.S. Cl.
CPC ............ *B62D 1/184* (2013.01); *B62D 1/183* (2013.01); *B62D 1/195* (2013.01)

(58) Field of Classification Search
CPC ......... B62D 1/183; B62D 1/184; B62D 1/195
See application file for complete search history.

(56) References Cited

U.S. PATENT DOCUMENTS

| 9,022,427 B2 * | 5/2015 | Schnitzer | F16M 13/02 |
| | | | 280/775 |
| 9,090,284 B2 | 7/2015 | Meyer et al. | |
| 9,327,756 B2 | 5/2016 | Rauber et al. | |
| 10,279,834 B2 * | 5/2019 | Stinebring | B62D 1/187 |
| 2006/0157949 A1 * | 7/2006 | Camp | B62D 1/184 |
| | | | 280/93.51 |
| 2008/0191455 A1 | 8/2008 | Bechtel et al. | |
| 2009/0241721 A1 | 10/2009 | Inoue et al. | |

(Continued)

FOREIGN PATENT DOCUMENTS

| DE | 102007039361 A1 | 5/2008 |
| JP | 2007261563 | 10/2007 |

OTHER PUBLICATIONS

EP Application No. 19199530.7, Extended European Search Report dated Jan. 10, 2020, 11 pages.

*Primary Examiner* — Drew J Brown
(74) *Attorney, Agent, or Firm* — thyssenkrupp North America, LLC

(57) ABSTRACT

An adjustable steering column assembly includes a lower jacket, a rake bracket, a rake guide, and a fastener coupling each. The lower jacket has an attachment portion with an end, and a passage extends from that end at least partially through the attachment portion. The attachment portion end has upper and lower seating faces extending into the passage. The rake bracket has a base portion and an arm with an aperture. The rake guide has upper and lower ends and a hole. The upper and lower ends respective have configurations complementary to configurations of the upper and lower seating faces, and the rake guide is positioned in the end of the lower jacket attachment portion such that the rake guide upper end mates with the upper seating face and such that the rake guide lower end mates with the lower seating face.

17 Claims, 7 Drawing Sheets

(56) References Cited

U.S. PATENT DOCUMENTS

| | | | |
|---|---|---|---|
| 2011/0162904 A1 | 7/2011 | Yoon et al. | |
| 2015/0232117 A1* | 8/2015 | Stinebring | B62D 1/195 74/493 |
| 2015/0251683 A1* | 9/2015 | Caverly | B62D 1/189 74/493 |
| 2015/0375770 A1* | 12/2015 | Buzzard | B62D 1/184 74/493 |
| 2016/0107676 A1* | 4/2016 | Kubota | B62D 1/184 74/495 |
| 2016/0252133 A1* | 9/2016 | Caverly | F16C 29/02 74/493 |
| 2017/0282960 A1* | 10/2017 | Matsuno | B62D 1/195 |
| 2018/0086363 A1 | 3/2018 | Stinebring et al. | |

\* cited by examiner

ADJUSTABLE STEERING COLUMN ASSEMBLY

FILED OF THE DISCLOSURE

The disclosure relates generally to the field of steering column assemblies for motor vehicles. More specifically, the disclosure relates to adjustable steering column assemblies.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, an adjustable steering column assembly includes a lower jacket, a rake bracket, a rake guide, and a fastener. The lower jacket has an attachment portion with an end, and a passage extends from the attachment portion end at least partially through the attachment portion. The attachment portion end has upper and lower seating faces extending into the passage. The rake bracket has a base portion with an arm extending therefrom, and the arm has an aperture. The rake guide has upper and lower ends and a hole. The upper end has a configuration complementary to a configuration of the upper seating face, the lower end has a configuration complementary to a configuration of the lower seating face, and the rake guide is positioned in the end of the lower jacket attachment portion such that the rake guide upper end mates with the upper seating face and such that the rake guide lower end mates with the lower seating face. The fastener couples the lower jacket, the rake bracket, and the rake guide, and the fastener passes through the aperture of the rake bracket, the hole of the rake guide, and past the rake guide in the passage.

In an embodiment, at least one of the following items includes a low friction coating: the upper seating face of the attachment portion end, the lower seating face of the attachment portion end, the upper end of the rake guide, and the lower end of the rake guide.

In an embodiment, the low friction coating includes at least one of the following items: sliding lacquer, polytetrafluoretylene (PTFE), molybdenum disulphide, a plasmapolymeric coating, and graphite.

In an embodiment, at least one of the following items includes a lubricant pocket containing a lubricant: the upper seating face of the attachment portion end, the lower seating face of the attachment portion end, the upper end of the rake guide, and the lower end of the rake guide.

In an embodiment, the attachment portion lower end has a guide rail protruding from the lower seating face and the rake guide has a guide rail protruding from the lower end. The guide rail of the rake guide has a configuration complementary to a configuration of the guide rail of the attachment portion lower end, and interaction between the guide rail of the rake guide and the guide rail of the attachment portion lower end aids in positioning the rake guide relative to the attachment portion lower end.

In an embodiment, the attachment portion end has an external perimeter formed by a continuous line in a single plane, and the upper and lower seating faces extend inwardly from the external perimeter into the passage.

In an embodiment, the rake guide upper end has a central curved area between rounded edge areas, the rake guide lower end has a central curved area between rounded edge areas, and the guide rail of the rake guide protrudes from the central curved area of the rake guide lower end.

In an embodiment, the rake guide upper end has a central curved area between rounded edge areas, the rake guide lower end has a central curved area between rounded edge areas, and the central curved area of the rake guide lower end includes at least one of the following items: a low friction coating, a lubricant pocket containing lubricant, and a guide rail.

In an embodiment, multiple pieces collectively form the rake guide.

In an embodiment, the rake guide is a unitary member.

In an embodiment, a second fastener is coaxial with the fastener, and the second fastener further couples the lower jacket to the rake bracket.

In an embodiment, the rake guide lower end and/or the rake guide upper end includes at least one of the following items: a low friction coating, a lubricant pocket containing lubricant, and a guide rail.

In an embodiment, the attachment portion has a guide rail protruding from the lower seating face.

In an embodiment, the rake guide has a guide rail protruding from the lower end.

According to another embodiment, an adjustable steering column assembly includes a lower jacket, a rake bracket, a rake guide, and a fastener. The lower jacket has an attachment portion with an end, and the attachment portion end has upper and lower seating faces. The rake bracket has a base portion with an arm extending therefrom, and the arm has an aperture. The rake guide has upper and lower ends and a hole. The upper end has a configuration complementary to a configuration of the upper seating face, the lower end has a configuration complementary to a configuration of the lower seating face, and the rake guide is positioned such that the rake guide upper end mates with the upper seating face and such that the rake guide lower end mates with the lower seating face. The fastener couples the lower jacket, the rake bracket, and the rake guide, and the fastener passes through the aperture of the rake bracket and the hole of the rake guide. The rake guide lower end and/or the rake guide upper end includes at least one of the following items: a low friction coating and a lubricant pocket containing lubricant.

In an embodiment, the attachment portion has a guide rail protruding from the lower seating face.

DETAILED DESCRIPTION

Figure 1:
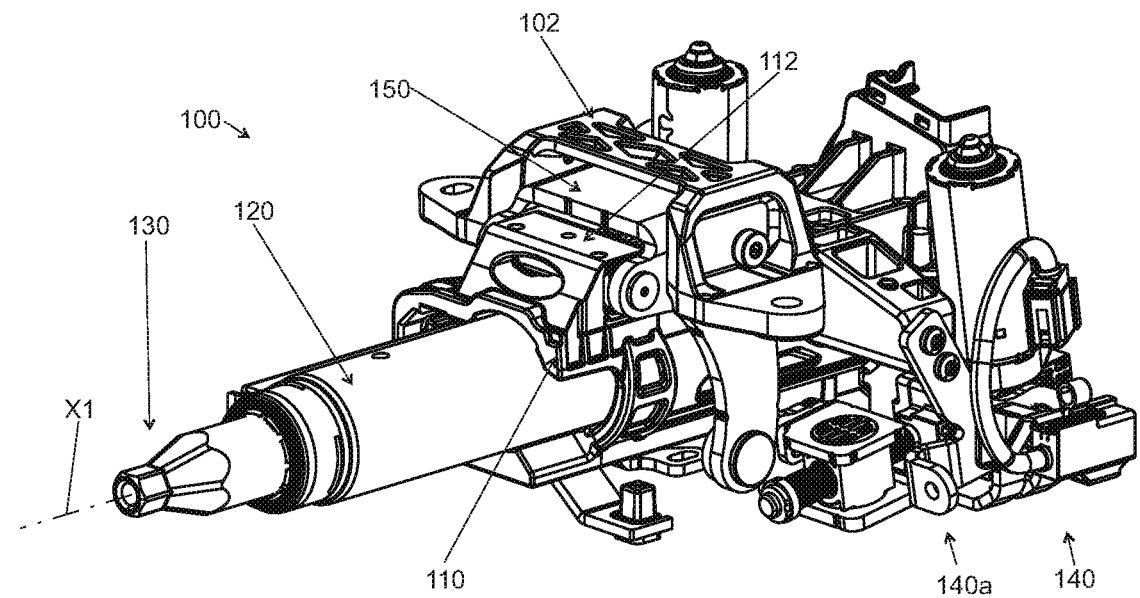
FIG. 1 is a perspective view showing an adjustable steering column assembly, according to an embodiment of the present disclosure.
Figure 2:
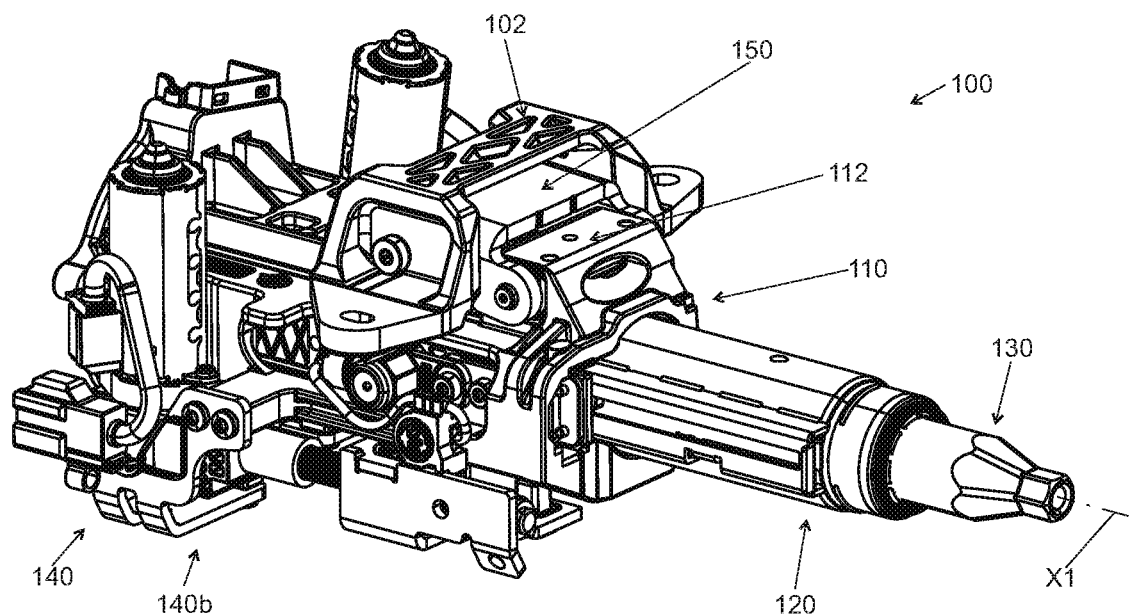
FIG. 2 is another perspective view showing the adjustable steering column assembly of FIG. 1.
Figure 3:
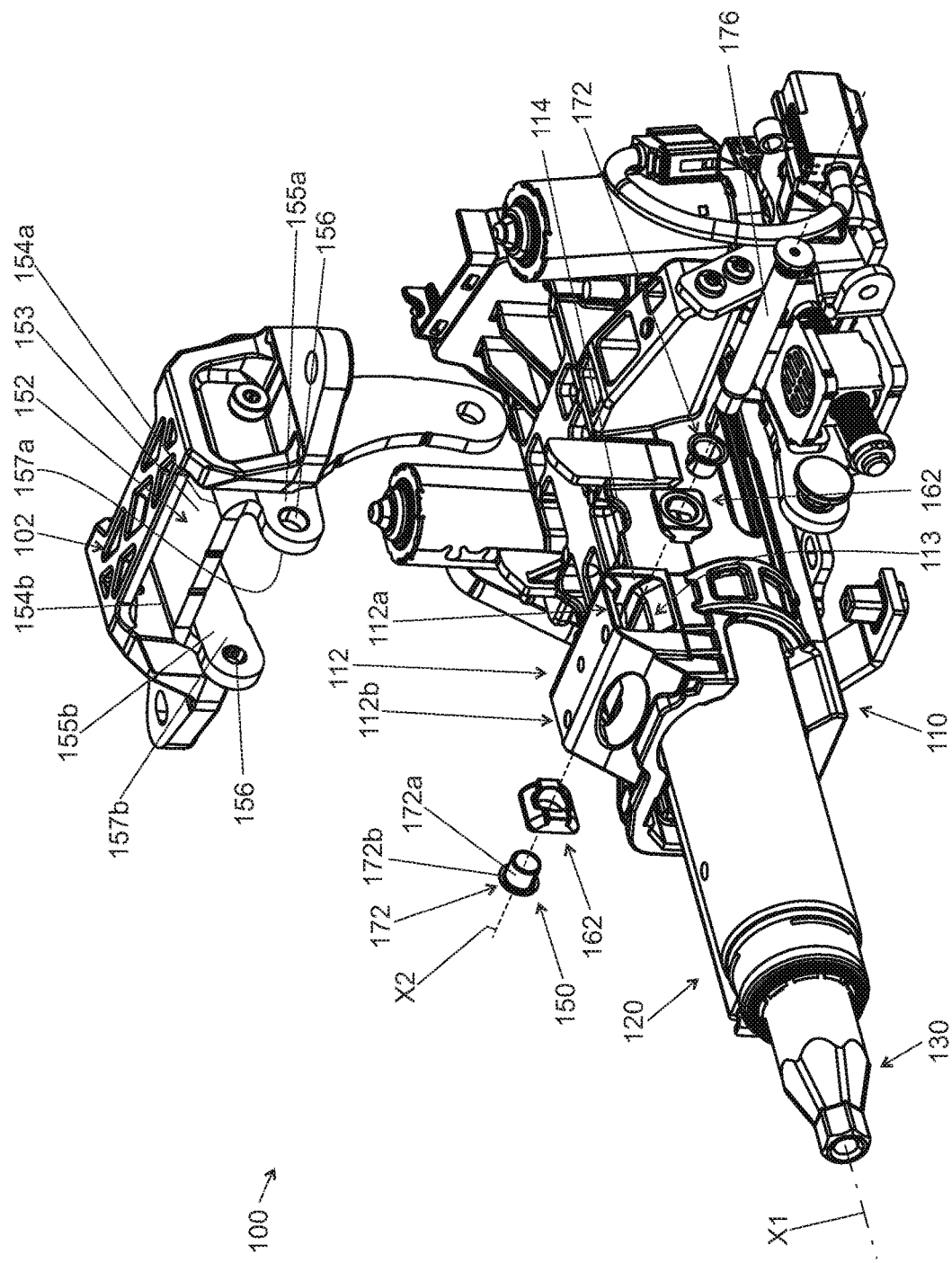
FIG. 3 is an exploded view showing the adjustable steering column assembly of FIG. 1.

Steering lash refers to a condition in which a steering wheel may be turned through some part of a revolution without associated movement of a vehicle's adjustable (typically front) wheels. Excessive amounts of lash are undesirable, and steering wheel lash is regulated for safety purposes; example regulations are set forth at 49 CFR 393.209 (b). Lash typically occurs due to clearance (either from design or wear) in joints between steering components. But while joints must be held together sufficiently rigidly to avoid excessive lash, too much rigidity between joins can inhibit adjustment of the steering system. Moreover, it may be desirable for joints to be adjustable (i.e., capable of being tuned), as such adjustment may counteract wear and extend system life. Adjustment may also be used provide a customized feel to the driver.

FIGS. 1 through 9 illustrate an adjustable steering column assembly 100, according to one embodiment. The steering column assembly 100 broadly includes a mounting bracket 102, a lower jacket 110, an upper jacket 120, a spindle 130, an adjustment unit 140, and a rake bracket subassembly 150. Broadly viewed, the upper jacket 120 rotatably supports the spindle (or "steering shaft") 130, the lower jacket 110 telescopically supports the upper jacket 120, the rake bracket subassembly 150 supports the lower jacket 110 while allowing height or tilt of the lower jacket 110 (and thus the upper jacket 120 and the spindle 130) to be adjusted, the mounting bracket 102 fastens the rake bracket subassembly 150 to a vehicle's chassis, and the adjustment unit 140 ultimately changes the position of the spindle 130 as desired (both in height/tilt and toward/away from the driver). The upper jacket 120 and the spindle 130 are coaxial along a longitudinal axis X1.

The mounting bracket 102, the upper jacket 120, the spindle 130, and the adjustment unit 140 may be any such components which are currently known in steering column assemblies or which are later developed, and the lower jacket 110 may telescopically support the upper jacket 120 in any manner which is currently known or later developed or a non-telescoping configuration may be used. The adjustment unit 140 may, for example, have one portion 140*a* for adjusting height/tilt (e.g., with an electric motor and a driven spindle, a driven nut, or gearing to tilt the lower jacket 110 relative to the bracket 102) and another portion 140*b* for adjusting the spindle 130 along the longitudinal axis X1 (e.g., with an electric motor and a driven spindle, a driven nut, or gearing to move the upper jacket 120 along the longitudinal axis X1 relative to the lower jacket 110). While countless appropriate mounting brackets, upper jackets, spindles, and telescopic portions of lower jackets exist, examples are disclosed in U.S. Pat. No. 9,090,284 to Meyer and U.S. Pat. No. 9,327,756 to Rauber, both assigned to THYSSENKRUPP PRESTA AKTIENGESELLSCHAFT, and the contents of each are incorporated herein in their entirety by reference. One of ordinary skill in the art will thus understand that the spindle 130 may be manually or automatically adjusted for both height and length.

Focus is now directed to the lower jacket 110 and the rake bracket subassembly 150, which are more specifically shown in FIGS. 3 through 9. The lower jacket 110 has an attachment portion 112 (see FIGS. 3 through 6) which may, for example, be configured as a slot (as shown), and which defines a passage 113 having an axis X2 generally perpendicular and skew to the axis X1. The attachment portion 112 has opposed ends 112*a*, 112*b*, and the passage 113 may extend fully through the attachment portion 112. The ends 112*a*, 112*b* may preferably be substantially similar to, or mirror images of, one another. In the embodiment 100, each end 112*a*, 112*b* is generally symmetrical about a vertical plane passing through the axis X2 while the axis X1 is positioned horizontally, and the ends 112*a*, 112*b* are substantially the same as one another. As such, only the end 112*a* is discussed in further specific detail.

Figure 4:
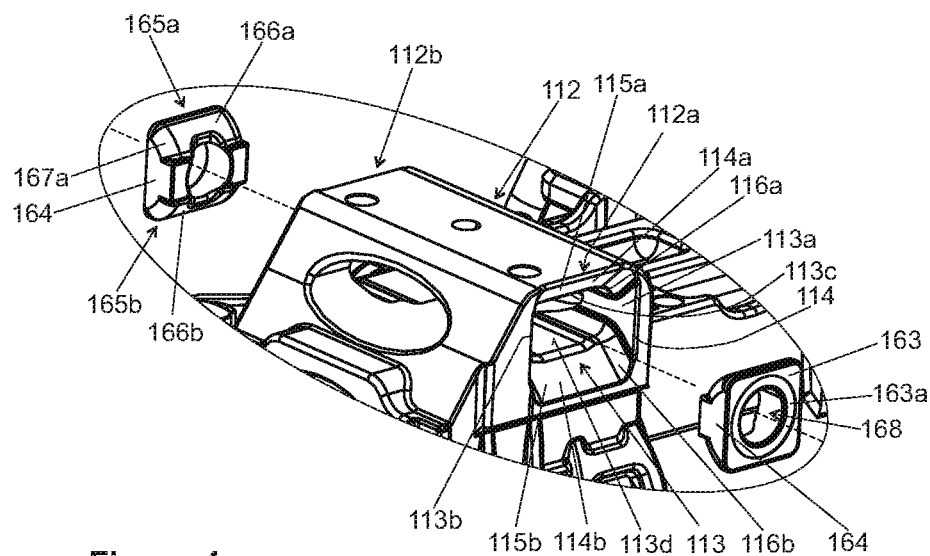
FIG. 4 is a partial view taken from FIG. 3.

As shown in FIG. 4, the end 112*a* has an external perimeter 114 and upper and lower seating faces 114*a*, 114*b*. The external perimeter 114 may be unbroken (i.e., formed by a continuous line in a single plane) and generally rectangular, and the upper and lower seating faces 114*a*, 114*b* extend inwardly from the external perimeter 114 into the passage 113. The passage 113 is generally defined by opposed sidewalls 113*a*, 113*b* which extend to the perimeter 114 and opposed top and bottom walls 113*c*, 113*d*, and the seating faces 114*a*, 114*b* in embodiment 100 include central curved areas 115*a*, 115*b* and rounded edge areas 116*a*, 116*b*.

Figure 5:
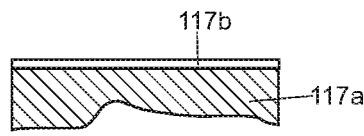
FIG. 5 is a section view illustrating a material composition of at least part of a lower jacket of the adjustable steering column assembly of FIG. 1.

It may be particularly desirable for the seating faces 114*a*, 114*b* and at least a portion of the sidewalls 113*a*, 113*b* adjacent the perimeter 114 to have a low-friction (i.e., friction reducing) coating 117*b* over a metal or composite structural core 117*a* (as shown in FIG. 5), and in some embodiments it may be desirable for the entire attachment portion 112 to have the metal or composite core 117*a* and the low-friction coating 117*b*. The low-friction coating 117*b* may include, for example, one or more of: sliding lacquer, polytetrafluoroethylene (PTFE), molybdenum disulphide, a plasmapolymeric coating, and graphite.

Turning now to the rake bracket subassembly 150, the rake bracket subassembly 150 has a bracket 152, rake guides 162, bushings 172 each having an axial portion 172*a* and a flange 172*b*, and a fastener 176. The bracket 152 (best shown in FIG. 3) has an upper (or "base") portion 153 with lateral ends 154*a*, 154*b*, and arms 155*a*, 155*b* extend downwardly from the respective ends 154*a*, 154*b*. Each arm 155*a*, 155*b* has a coaxial hole 156 sized to pass part of the fastener 176 therethrough, and the arms 155*a*, 155*b* are configured such that the arms 155*a*, 155*b* may extend on opposite sides of the attachment portion 112 when the holes 156 are aligned with the axis X2. It may be desirable for each of the arms 155*a*, 155*b* to have a generally planar interior face 157*a*, 157b, and for the generally planar interior faces 157a, 157b to be generally parallel to one another.

Figure 8:
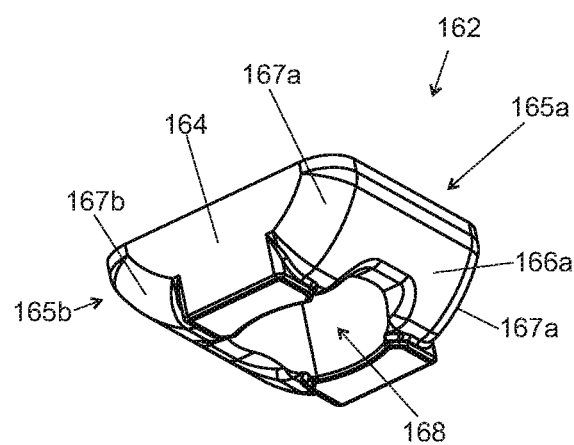
FIG. 8 is a perspective view of a rake guide of the adjustable steering column assembly of FIG. 1.

In the embodiment 100, the rake guides 162 are substantially similar to one another, just as the ends 112a, 112b are substantially similar to one another; in other embodiments this need not be the case, though the rake guides 162 are configured to respectively be complementary to the ends 112a, 112b. As shown in FIGS. 4 and 8, each rake guide 162 has a generally planar distal face 163, opposed generally planar sides 164, upper and lower ends 165a, 165b, and a hole 168 configured to pass part of the fastener 176 therethrough. The distal face 163 has a seat 163a (FIG. 4) for receiving the flange 172b (FIG. 3) of a respective bushing 172. And the upper and lower ends 165a, 165b are complementary to the seating faces 114a, 114b. More particularly, the upper and lower ends 165a, 165b have central curved areas 166a, 166b and rounded edge areas 167a, 167b that are respectively complementary to the central curved areas 115a, 115b and the rounded edge areas 116a, 116b.

Figure 9:
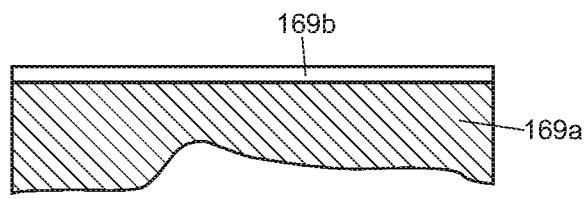
FIG. 9 is a section view illustrating a material composition of at least part of the rake guide of FIG. 8.

It may be particularly desirable for the upper and lower ends 165a, 165b and the sides 164 to have a low friction (i.e., friction reducing) coating 169b over a metal or composite structural core 169a (as shown in FIG. 9), and in some embodiments it may be desirable for the entire rake guide 162 to have the metal or composite core 169a and the low friction coating 169b. The low-friction coating 169b may include, for example, one or more of: sliding lacquer, polytetrafluorethylene (PTFE), molybdenum disulphide, a plasmapolymeric coating, and graphite.

In use, the rake guides 162 are respectively positioned in the lower jacket attachment portion 112. More particularly, each upper end 165a abuts a respective upper seating face 114a (with the upper central curved areas 166a and the rounded edge areas 167a abutting the upper central curved areas 115a and the rounded edge areas 116a), each lower end 165b abuts a respective lower seating face 114b (with the lower central curved areas 166b and the rounded edge areas 167b abutting the lower central curved areas 115b and the rounded edge areas 116b), and the sides 164 abutting the sidewalls 113a, 113b. Positioning of the rake guides 162 in the attachment portion 112 may allow the rake guides 162 to move along the axis X2 while being generally constrained rotationally and in other linear directions. The coatings 117b, 169b may allow the rake guides 162 to be positioned with little friction or resistance.

Once the rake guides 162 are in place, the bushings 172 are passed through the rake guide holes 168, the bracket holes 156 are aligned with the rake guide holes 168, and the fastener (e.g., bolt) 176 may pass through the bracket holes 156, the rake guide holes 168, and the passage 113 to fasten the rake bracket 152 to the lower jacket 110. The fastener 176 may be secured using a nut, by caulking an end of the fastener 176, or through any other appropriate device or method, whether now known or later developed.

Use of the described embodiments may provide desirable steering lash performance. And if the lash performance becomes undesirable, the rake guides 162 and/or the bushings 172 may be replaced or repaired. The low friction between the rake guides 162 and the lower jacket attachment portion 112 (e.g., resulting from the coatings 117b, 169b) may further aid in expanding the useful life of the adjustable steering column assembly 100.

Figure 10:
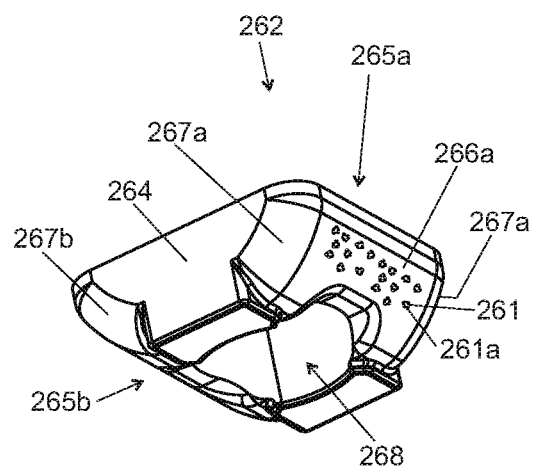
FIG. 10 is a perspective view of a rake guide, according to another embodiment of the present disclosure.

FIG. 10 shows another rake guide 262 according to an embodiment of the current disclosure, for use with the adjustable steering column assembly 100 as a replacement for the rake guide 162. The rake guide 262 is substantially similar to the rake guide 162 described above, except as specifically noted and/or shown, or as would be inherent. Further, those skilled in the art will appreciate that the embodiment 100 (including the rake guide 162) may be modified in various ways, such as through incorporating all or part of any of the various described embodiments, for example. For uniformity and brevity, reference numbers from 200 to 299 may be used to indicate elements corresponding to those discussed above numbered from 100 to 199 (e.g., sides 264 correspond generally to the sides 164; upper and lower ends 265a, 265b correspond generally to the upper and lower ends 165a, 165b; central curved areas 266a, 266b correspond generally to the central curved areas 166a, 166b; rounded edge areas 267a, 267b correspond generally to the rounded edge areas 167a, 167b; hole 268 corresponds generally to the hole 168; et cetera), though with any noted, shown, or inherent deviations.

The rake guide 262 primarily differs from the rake guide 162 by including at least one lubricant pocket 261 on the central curved areas 266a, 266b. In some embodiments, the rake guide 262 may include the lubricant pockets 261 on only one (not both) of the central curved areas 266a, 266b. Multiple lubricant pockets 261 may be located in a pattern or randomly, and may each be of the same or different shapes and sizes. But each of the lubricant pockets 261 extends inwardly away from the outer surface of the rake guide 262. The lubricant pockets 261 may include a grease lubricant 261a or a lubricating oil. In use, the lubricant 261a in the lubricant pockets 261 may further reduce friction between the rake guide 262 and the lower jacket attachment portion 112. In some embodiments, the lubricant pockets 261 and the grease lubricant 261a may be sufficient such that the rake guide 262 does not include a coating equivalent to the coating 169b. In other embodiments, the rake guide 262 may include both a low-friction coating 269b substantially similar to the low-friction coating 169b and one or more of the lubricant pockets 261, as such embodiments may improve performance over embodiments which have neither the low-friction coating nor a lubricant pocket, which have only the low-friction coating, and which have only the lubricant pocket.

Figure 11:
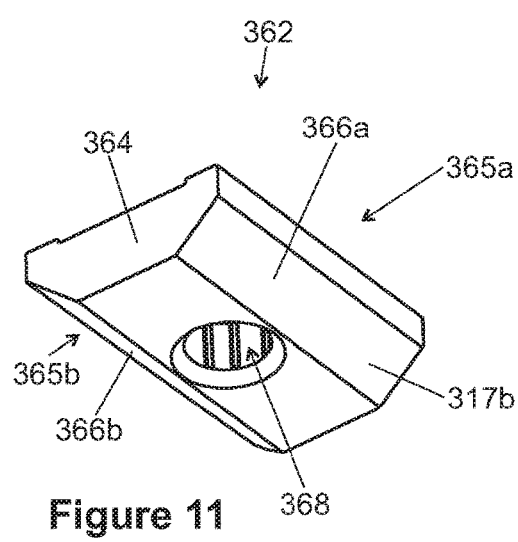
FIG. 11 is a perspective view of a rake guide, according to still another embodiment of the present disclosure.
Figure 12:
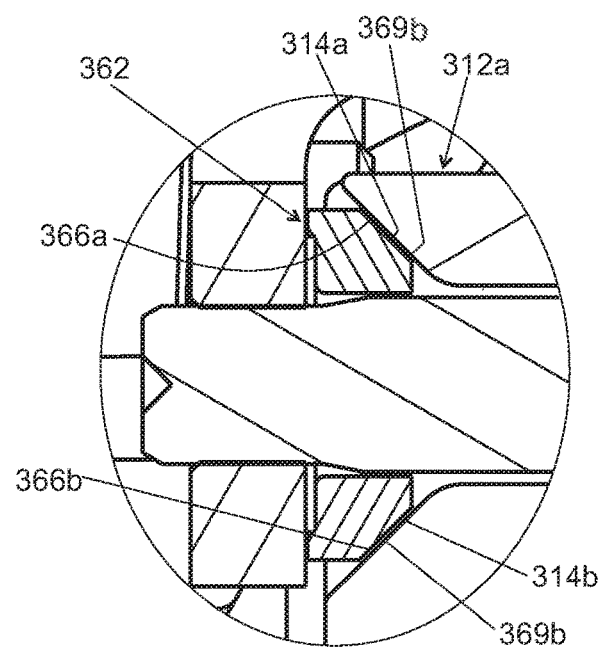
FIG. 12 is a section view showing the rake guide of FIG. 11 in use.

FIGS. 11 and 12 show another rake guide 362 and attachment portion end 312a according to another embodiment of the current disclosure, for use with the adjustable steering column assembly 100 as a replacement for the rake guide 162 and the attachment portion end 112a. The rake guide 362 and the attachment portion end 312a are substantially similar to the rake guide 162 and the attachment portion end 112a described above, except as specifically noted and/or shown, or as would be inherent. Further, those skilled in the art will appreciate that the embodiment 100 (including the rake guide 162 and the attachment portion end 112a) may be modified in various ways, such as through incorporating all or part of any of the various described embodiments, for example. For uniformity and brevity, reference numbers from 300 to 399 may be used to indicate elements corresponding to those discussed above numbered from 100 to 199 (e.g., sides 364 correspond generally to the sides 164; upper and lower ends 365a, 365b correspond generally to the upper and lower ends 165a, 165b; hole 368 corresponds generally to the hole 168; et cetera), though with any noted, shown, or inherent deviations.

Figure 13:
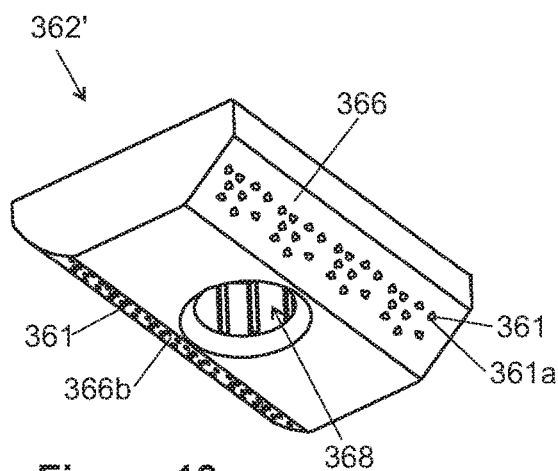
FIGS. 13 through 15 are perspective views of rake guides, according to still yet other embodiments of the present disclosure.

The rake guide 362 and the attachment portion end 312a primarily differ from the rake guide 162 and the attachment portion end 112a in the configuration used to seat the rake guide 362 in the attachment portion end 312a. More particularly, instead of having rounded and curved areas 166a, 166b, 167a, 167b which seat in a correspondingly-shaped end 112a (see FIGS. 4 and 8), the rake guide 362 has generally planar abutting faces 366a, 366b and the attachment portion end 312a has complementary upper and lower seating faces 314a, 314b. As with the other embodiments, the rake guide 362 and/or the abutting faces 366a, 366b may include a low-friction coating 317b, 369b substantially similar to the low-friction coatings 117b, 169b. And, as shown in FIG. 13, an embodiment 362' of the rake guide 362 may include at least one lubricant pocket 361 with lubricant 361a on the abutting faces 366a, 366b, substantially similar to the lubricant pockets 261 and the grease lubricant 261a. And, as discussed above regarding the rake guide 262, the rake guides 362, 362' may or may not have the low-friction coating 317b.

Figure 14:
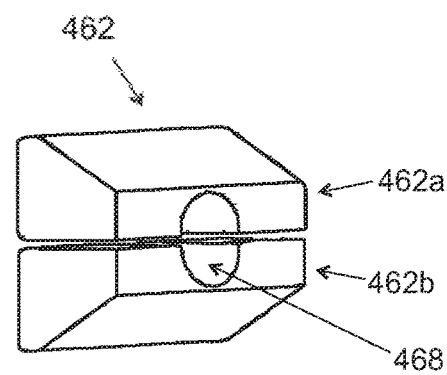

FIG. 14 very simply illustrates another rake guide 462 for use with the adjustable steering column assembly 100 as a replacement for the rake guide 162. The primary teaching of the rake guide 462 is that the rake guide 462 may be constructed as multiple pieces 462a, 462b which are collectively used to form the rake guide 462. While the pieces 462a, 462b of the rake guide 462 are of generally the same size and mirror images to one another, in other embodiments one piece may be substantially larger than the other (and may, for example, define entire hole 468). This teaching of multiple pieces 462a, 462b collectively forming the rake guide 462 is equally applicable to the other rake guides disclosed herein, and those skilled in the art will appreciate that each may be modified in this way.

Figure 15:
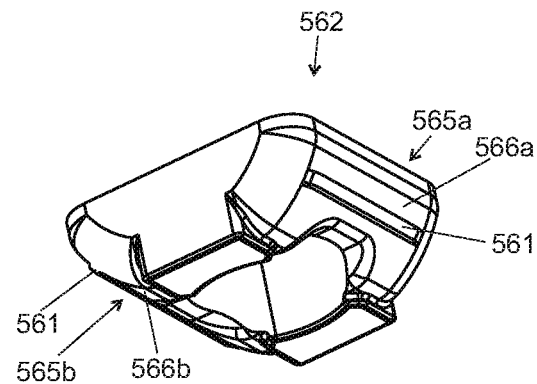
Figure 16:
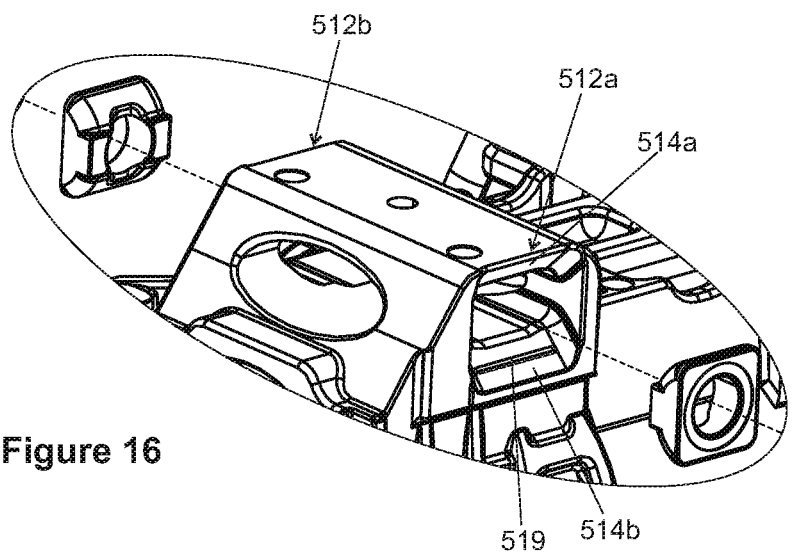
FIG. 16 is an exploded view showing the rake guide of FIG. 15 and an attachment portion, according to another embodiment of the present disclosure.

FIGS. 15 and 16 show another rake guide 562 and attachment portion end 512a according to another embodiment of the current disclosure, for use with the adjustable steering column assembly 100 as a replacement for the rake guide 162 and the attachment portion end 112a. The rake guide 562 and the attachment portion end 512a are substantially similar to the rake guide 162 and the attachment portion end 112a described above, except as specifically noted and/or shown, or as would be inherent. Further, those skilled in the art will appreciate that the embodiment 100 (including the rake guide 162 and the attachment portion end 112a) may be modified in various ways, such as through incorporating all or part of any of the various described embodiments, for example. For uniformity and brevity, reference numbers from 500 to 599 may be used to indicate elements corresponding to those discussed above numbered from 100 to 199 (e.g., upper and lower ends 565a, 565b correspond generally to the upper and lower ends 165a, 165b; central curved areas 566a, 566b correspond generally to the central curved areas 166a, 166b; attachment portion ends 512a, 512b correspond generally to the attachment portion ends 112a, 112b; seating faces 514a, 514b correspond generally to the seating faces 114a, 114b; et cetera), though with any noted, shown, or inherent deviations.

The rake guide 562 and the attachment portion ends 512a, 512b primarily differ from the rake guides 162 and the attachment portion ends 112a, 112b in the inclusion of guide protrusions (or "guide rails"). More particularly, a guide rail 561 extends from each central curved area 566a, 566b of the rake guide 562, and the seating faces 514a, 514b each include a guide rail 519 complementary to the guide rails 561. Interaction between the guide rails 561, 519 may help positioning and maintaining position of the rake guides 562. In some embodiments, only the lower seating faces 514b may include guide rails 519, and in such embodiments, the upper central curved areas 566a may or may not include guide rails 561. The guide rails thus form discrete contact sections between the rake guides and the seating faces.

Figure 17:
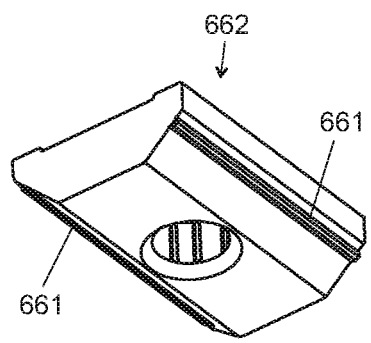
FIGS. 17 and 18 are perspective views of rake guides, according to still further embodiments of the present disclosure.
Figure 18:
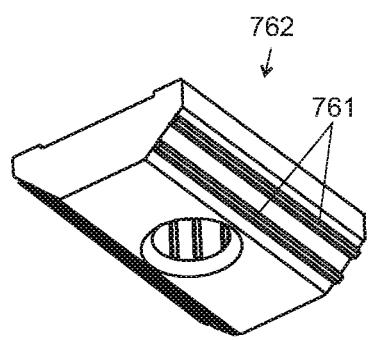

FIG. 17 illustrates that other configurations of rake guides 662 (different from the rake guides 562) may also include guide rails 661, and FIG. 18 illustrates that rake guides 762 (as well as any of the other rake guides disclosed herein) may have additional guide rails 761. If additional guide rails 761 are included, the corresponding seating faces may similarly include additional guide rails.

Figure 19:
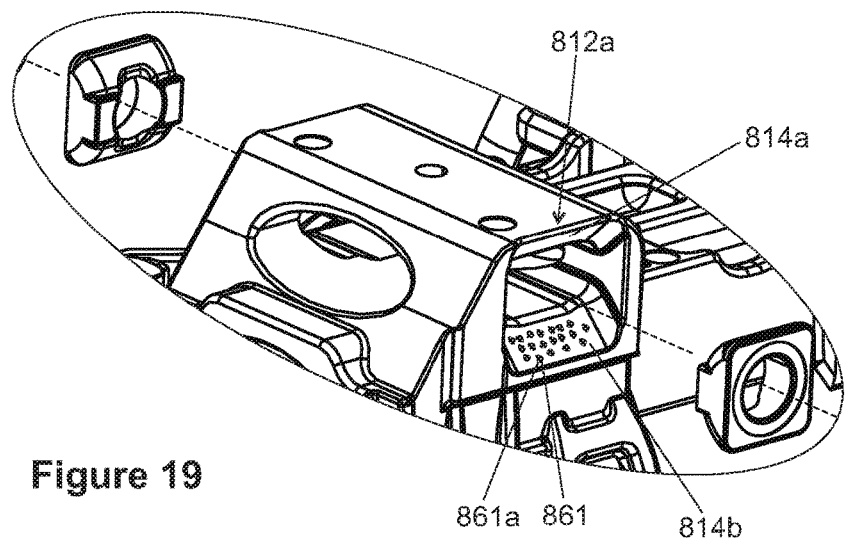
FIG. 19 is an exploded view showing the rake guide of FIG. 8 and an attachment portion, according to still another embodiment of the present disclosure.

FIG. 19 shows another attachment portion end 812a according to another embodiment of the current disclosure, for use with the adjustable steering column assembly 100 as a replacement for the attachment portion end 112a. The attachment portion end 812a is substantially similar to the attachment portion end 112a described above, except as specifically noted and/or shown, or as would be inherent. Further, those skilled in the art will appreciate that the embodiment 100 (including the attachment portion end 112a) may be modified in various ways, such as through incorporating all or part of any of the various described embodiments, for example. For uniformity and brevity, reference numbers from 800 to 899 may be used to indicate elements corresponding to those discussed above numbered from 100 to 199 (e.g., seating faces 814a, 814b correspond generally to seating faces 114a, 114b, et cetera), though with any noted, shown, or inherent deviations.

The attachment portion end 812a primarily differs from the attachment portion end 112a in that at least one of the seating faces 814a, 814b includes at least one lubricant pocket 861 with lubricant 861a. The lubricant pockets 861 and the grease lubricant 861a may be substantially similar to the lubricant pockets 261 and the grease lubricant 261a discussed above. And, as discussed above regarding the rake guide 262, the seating faces 114a, 114b may or may not have the low-friction coating 369b if the lubricant pockets 861 and the grease lubricant 861a are included. In use, the lubricant 861a in the lubricant pockets 861 may further reduce friction between the rake guide 162 and the lower jacket attachment portion end 812a.

Figure 6:
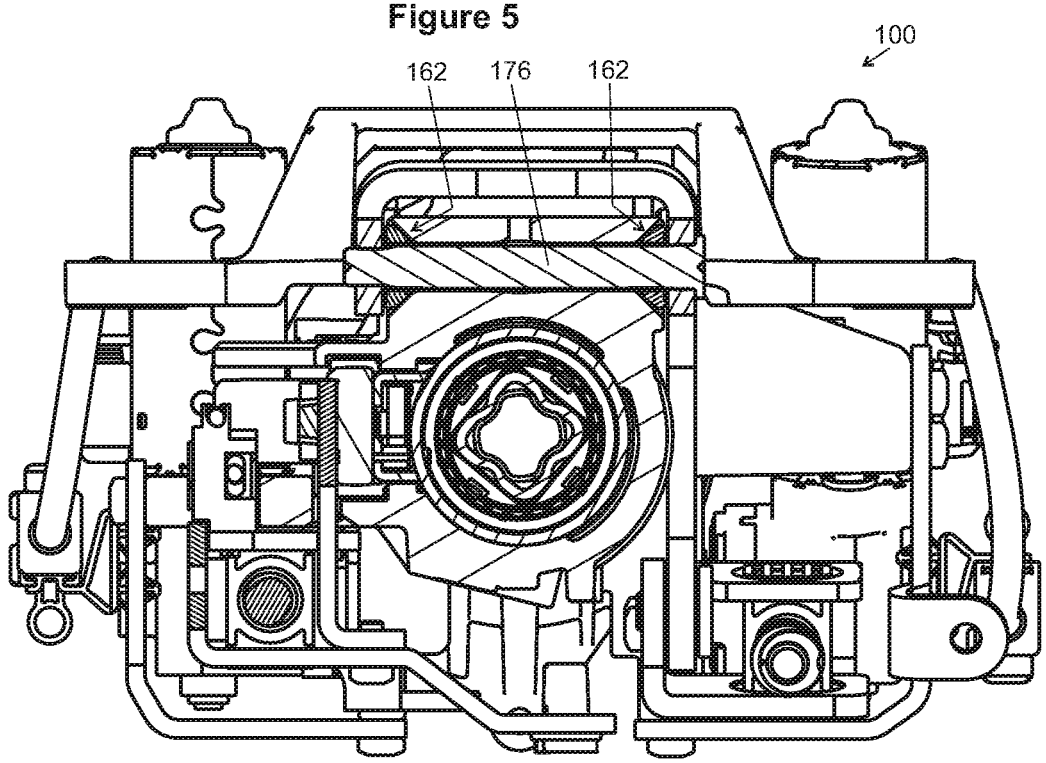
FIG. 6 is an end view of the adjustable steering column assembly of FIG. 1, with portions being shown in section for illustration.
Figure 7:
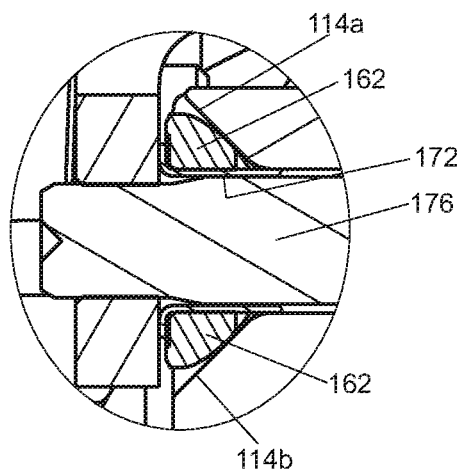
FIG. 7 is a partial view taken from FIG. 6.
Figure 20:
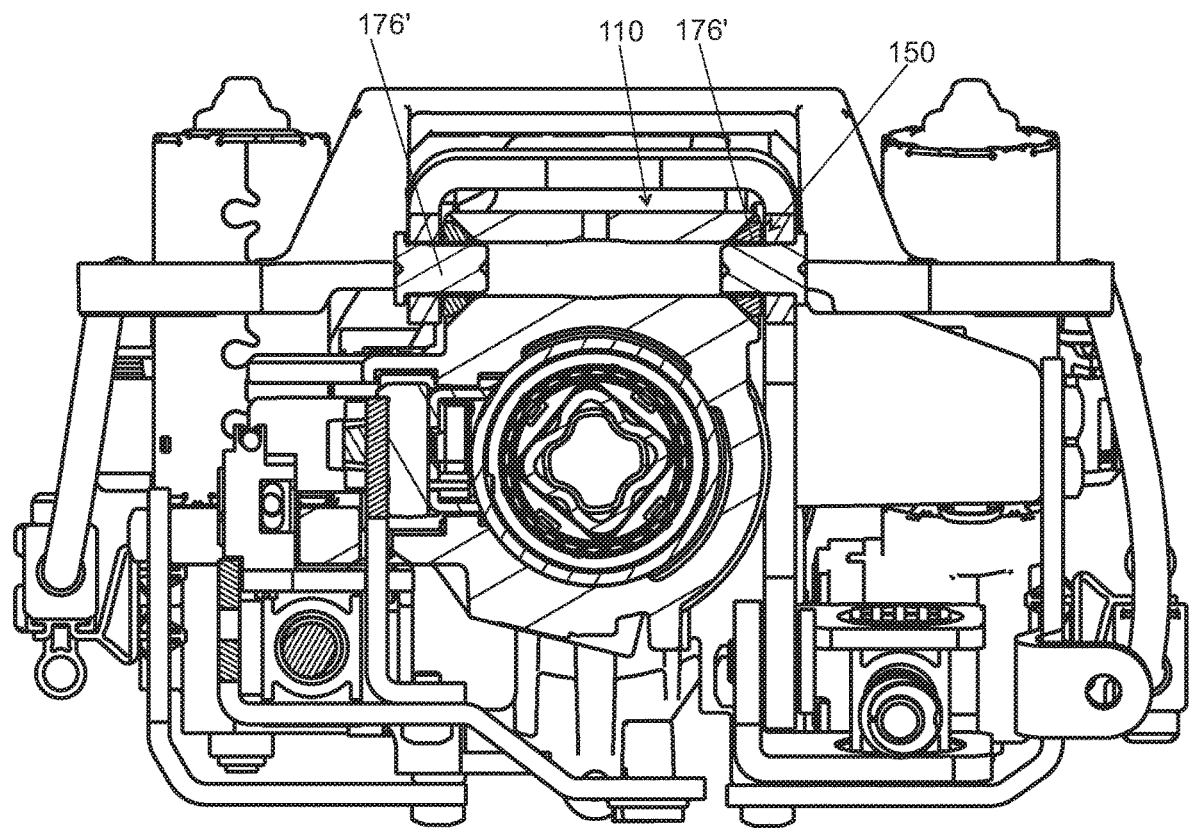
FIG. 20 is an end view with portions being shown in section for illustration, similar to FIG. 6 but with alternate fasteners.

FIG. 20 very simply illustrates that instead of a single fastener 176 (e.g., a bolt or other appropriate fastener) being used to pin or otherwise secure the rake bracket assembly 150 to the lower jacket 110 (as shown in FIG. 6), multiple fasteners 176' (e.g., bolts or other appropriate fasteners) may be used.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. An adjustable steering column assembly, comprising:
   a lower jacket having an attachment portion with an end, a passage extending from the attachment portion end at least partially through the attachment portion, the attachment portion end having upper and lower seating faces extending into the passage;
   a rake bracket having a base portion with an arm extending therefrom, the arm having an aperture;

a rake guide having upper and lower ends and a hole, the upper end having a configuration complementary to a configuration of the upper seating face, the lower end having a configuration complementary to a configuration of the lower seating face, the rake guide being positioned in the end of the lower jacket attachment portion such that the rake guide upper end mates with the upper seating face, such that the rake guide lower end mates with the lower seating face, and such that the lower jacket attachment portion prevents rotation of the rake guide, wherein the rake guide upper end has a central curved area between rounded edge areas, wherein the rake guide lower end has a central curved area between rounded edge areas, wherein the central curved area of the rake guide lower end includes at least one item selected from the group consisting of the following:
a low friction coating;
a lubricant pocket containing lubricant; and
a first guide rail; and
a fastener coupling the lower jacket, the rake bracket, and the rake guide, wherein the fastener passes through the aperture of the rake bracket, the hole of the rake guide, and past the rake guide in the passage.

2. The adjustable steering column assembly of claim 1, wherein at least one item selected from the group consisting of the following includes a low friction coating:
the upper seating face of the attachment portion end;
the lower seating face of the attachment portion end; and
the upper end of the rake guide.

3. The adjustable steering column assembly of claim 2, wherein the low friction coating of at least one of the upper seating face, the lower seating face, and the upper end includes at least one item selected from the group consisting of: sliding lacquer, molybdenum disulphide, a plasmapolymeric coating, and graphite.

4. The adjustable steering column assembly of claim 2, wherein at least one item selected from the group consisting of the following includes a lubricant pocket containing a lubricant:
the upper seating face of the attachment portion end;
the lower seating face of the attachment portion end; and
the upper end of the rake guide.

5. The adjustable steering column assembly of claim 4, wherein:
the attachment portion lower end has a second guide rail protruding from the lower seating face; and
the rake guide includes the first guide rail protruding from the lower end, the first guide rail of the rake guide having a configuration complementary to a configuration of the second guide rail of the attachment portion lower end, interaction between the first guide rail of the rake guide and the second guide rail of the attachment portion lower end aiding in positioning the rake guide relative to the attachment portion lower end.

6. The adjustable steering column assembly of claim 5, wherein:
the attachment portion end has an external perimeter formed by a continuous line in a single plane; and
the upper and lower seating faces extend inwardly from the external perimeter into the passage.

7. The adjustable steering column assembly of claim 1, wherein at least one item selected from the group consisting of the following includes a lubricant pocket containing a lubricant:
the upper seating face of the attachment portion end;
the lower seating face of the attachment portion end; and
the upper end of the rake guide.

8. The adjustable steering column assembly of claim 1, wherein:
the attachment portion lower end has a second guide rail protruding from the lower seating face; and
the rake guide includes the first guide rail protruding from the lower end, the first guide rail of the rake guide having a configuration complementary to a configuration of the second guide rail of the attachment portion lower end, interaction between the first guide rail of the rake guide and the second guide rail of the attachment portion lower end aiding in positioning the rake guide relative to the attachment portion lower end.

9. The adjustable steering column assembly of claim 8, wherein the central curved area of the rake guide lower end includes the first guide rail, which protrudes from the central curved area of the rake guide lower end.

10. The adjustable steering column assembly of claim 1, wherein:
the attachment portion end has an external perimeter formed by a continuous line in a single plane; and
the upper and lower seating faces extend inwardly from the external perimeter into the passage.

11. The adjustable steering column assembly of claim 1, wherein multiple pieces collectively form the rake guide.

12. The adjustable steering column assembly of claim 1, wherein the rake guide is a unitary member.

13. The adjustable steering column assembly of claim 1, further comprising a second fastener coaxial with the fastener, the second fastener further coupling the lower jacket to the rake bracket.

14. The adjustable steering column assembly of claim 1, wherein the rake guide upper end includes at least one item selected from the group consisting of the following:
a low friction coating;
a lubricant pocket containing lubricant; and
a guide rail.

15. An adjustable steering column assembly, comprising:
a lower jacket having an attachment portion with an end, a passage extending from the attachment portion end at least partially through the attachment portion, the attachment portion end having upper and lower seating faces extending into the passage, wherein the attachment portion end has an external perimeter formed by a continuous line in a single plane, wherein the upper and lower seating faces extend inwardly from the external perimeter into the passage;
a rake bracket having a base portion with an arm extending therefrom, the arm having an aperture;
a rake guide having upper and lower ends and a hole, the upper end having a configuration complementary to a configuration of the upper seating face, the lower end having a configuration complementary to a configuration of the lower seating face, the rake guide being positioned in the end of the lower jacket attachment portion such that the rake guide upper end mates with the upper seating face, such that the rake guide lower end mates with the lower seating face, and such that the lower jacket attachment portion prevents rotation of the rake guide, wherein the rake guide upper end has a central curved area between rounded edge areas, wherein the rake guide lower end has a central curved area between rounded edge areas; and
a fastener coupling the lower jacket, the rake bracket, and the rake guide, wherein the fastener passes through the aperture of the rake bracket, the hole of the rake guide, and past the rake guide in the passage.

16. An adjustable steering column assembly, comprising:
a lower jacket having an attachment portion with an end, a passage extending from the attachment portion end at least partially through the attachment portion, the attachment portion end having upper and lower seating faces extending into the passage, wherein the attachment portion has a guide rail protruding from the lower seating face;
a rake bracket having a base portion with an arm extending therefrom, the arm having an aperture;
a rake guide having upper and lower ends and a hole, the upper end having a configuration complementary to a configuration of the upper seating face, the lower end having a configuration complementary to a configuration of the lower seating face, the rake guide being positioned in the end of the lower jacket attachment portion such that the rake guide upper end mates with the upper seating face, such that the rake guide lower end mates with the lower seating face, and such that the lower jacket attachment portion prevents rotation of the rake guide; and
a fastener coupling the lower jacket, the rake bracket, and the rake guide, wherein the fastener passes through the aperture of the rake bracket, the hole of the rake guide, and past the rake guide in the passage.

17. An adjustable steering column assembly comprising:
a lower jacket having an attachment portion with an end, a passage extending from the attachment portion end at least partially through the attachment portion, the attachment portion end having upper and lower seating faces extending into the passage;
a rake bracket having a base portion with an arm extending therefrom, the arm having an aperture;
a rake guide having upper and lower ends and a hole, the upper end having a configuration complementary to a configuration of the upper seating face, the lower end having a configuration complementary to a configuration of the lower seating face, the rake guide being positioned in the end of the lower jacket attachment portion such that the rake guide upper end mates with the upper seating face and such that the rake guide lower end mates with the lower seating face, wherein the rake guide has a guide rail protruding from the lower end; and
a fastener coupling the lower jacket, the rake bracket, and the rake guide, wherein the fastener passes through the aperture of the rake bracket, the hole of the rake guide, and past the rake guide in the passage.

* * * * *